Sept. 24, 1968 R. L. EILENBERGER 3,403,285

ELECTROLUMINESCENT DISPLAY MATRIX FOR CATHODE RAY TUBE

Filed Dec. 14, 1965 2 Sheets-Sheet 1

INVENTOR
R. L. EILENBERGER
BY John K. Mullarney
ATTORNEY

ELECTROLUMINESCENT DISPLAY MATRIX FOR CATHODE RAY TUBE

Filed Dec. 14, 1965 2 Sheets-Sheet 2

United States Patent Office 3,403,285
Patented Sept. 24, 1968

3,403,285

ELECTROLUMINESCENT DISPLAY MATRIX FOR CATHODE RAY TUBE

Robert L. Eilenberger, Bridgewater Township, Somerset County, N.J., assignor to Bell Telephone Laboratories, Incorporated, New York, N.Y., a corporation of New York Filed Dec. 14, 1965, Ser. No. 513,685
4 Claims. (Cl. 315—13)

ABSTRACT OF THE DISCLOSURE

An electroluminescent display matrix on the faceplate of a cathode ray tube comprises strip electrodes which are extended beyond the boundaries of the matrix. The extended electrodes beyond each boundary are scanned by individually controlled cathode ray beams. A luminescent spot is produced in the display matrix at the intersection of any two strip electrodes respectively energized by cathode ray beams.

This invention relates to cathode ray tubes and more particularly to a new cathode ray tube information display structure to achieve high resolution visual displays.

The information displayed by a conventional cathode ray tube generally comprises a visual image corresponding to controlled deflections of the cathode ray beam. The visual image is created by directing the cathode ray beam onto an anode screen coated with a luminescent material responsive to the electron excitation of the beam. The luminescent coating gives off visible light at the location where the cathode ray beam excites it.

The ability of a cathode ray tube to display accurate and detailed information is measured primarily by its quality of resolution (i.e., the fineness of discernible detail that can be obtained). The quality of resolution of a cathode ray tube is measured to a great extent by the size and shape of the illuminated spot produced by the cathode ray beam exciting the luminescent anode screen. This quality of resolution directly limits the usefulness of a cathode ray tube for high speed information displays and its ability to clearly display fast transients. The size of the illuminated spot per se is also a direct limitation on the amount of detail of information that can be displayed.

The limitations on the size of an illuminated spot in the conventional cathode ray tube are determined chiefly by the characteristics of the luminescent coating of the cathode ray screen and by the characteristics of the electron optical system used to focus the cathode ray beam onto the screen. The luminescent coating characteristics of the cathode ray tube screen include such factors as the granulation of the luminescent deposits on the screen and the internal reflections caused by the various surfaces of the faceplate structure. These limitations are discussed extensively in the literature of the art; see, for instance, "Cathode Ray Tube Displays" by Soller, Starr and Valley, McGraw-Hill, 1948. The electron optic system used to focus the cathode ray beam suffers from inherent defects which further contribute to the limitations on the attainable resolution. The chief one of these factors is the aberration phenomena. Aberrations in electron optics are analogous to those found in the light optical systems and cause distortion of the illuminated spot in much the same way. These aberrations include such phenomena as astigmatism, which is due to differing focal lengths when the cathode ray beam deviates from the axis of the tube, and distortion wherein, due to imperfections in the focusing field, the resultant image does not lie in the plane of the screen. These and other additional focusing limitations restrict both the fineness of detail that can be displayed and the uniformity of resolution which can be attained over the entire display area.

The deflection of the cathode ray beam in the conventional cathode ray tube is controlled by an applied field which effects an angular displacement of the cathode ray beam about the thermionic source. Since the beam is projected onto a substantially flat anode screen, the deflection of the illuminated spot excited by the beam will be nonlinear in response to a linear change in the applied field (i.e., a linear angular deflection becomes a nonlinear scan velocity on the screen). This nonlinearity increases as the beam is increasingly deflected from the center axis of the cathode ray tube. These nonlinearities of deflection have been minimized in the past by limiting the angular deflection of the cathode ray beam. However, this nonlinearity is another inherent limitation on the ability of the conventional cathode ray tube to accurately display information.

Additional limitations on the resolution possible in a cathode ray display occur due to the fact that the thermionic source of electrons for the cathode ray beam can only approximate, at best, a point source. This is a limitation on the minimum cross section of the cathode ray beam and hence is a restriction on the minimum size of the illuminated spot that can be achieved.

It is accordingly a principal object of the present invention to generate a high resolution display of information in a cathode ray tube independent of the resolution limitations inherent in conventional cathode ray beam tubes.

Another object of the present invention is to display information with a uniform degree of resolution over the entire display area.

It is yet another object to control the size and shape of illuminated spots independently of the cross section of the cathode ray beam.

It is still another object of the present invention to compensate for nonlinearities in the scan velocity of the exciting cathode ray beam.

These objects are achieved in accordance with the present invention wherein a display matrix is formed on the faceplate of a cathode ray tube by placing a layer of electroluminescent material intermediate crossed parallel arrays of transparent conductive strip electrodes which form a perpendicular interlace with each other on opposite sides of the electroluminescent layer. Alternate strip electrodes of each array are extended beyond the display area on opposite sides of each array. Separate electron guns in the cathode ray tube generate individual cathode ray beams to commutate each separate array of extended strip electrodes.

The extended strip electrodes of one direction (i.e., all the horizontal strip electrodes, for instance) are connected to a reference potential, via respective cathode ray beam responsive gates. A cathode ray beam by activating a selected one of the gates enables electrical conduction through the gate which places one of the strip electrodes of the display matrix at the reference potential. One of the extended strip electrodes perpendicular to the said one direction is excited at the potential of its own commutating cathode ray beam. This establishes an electric field at the intersection of the two commutated strip electrodes at the display matrix and consequently causes an illuminated spot at this point of intersection. The size of this illuminated spot is determined by the common intersection area of the intersecting electrodes. It can be seen from the foregoing that with narrow electrodes that are closely spaced, an illuminated spot with very fine resolution of detail can be achieved, which is independent of the luminescent and focusing properties of conventional cathode ray tubes.

A feature of the present invention is that the arrays of strip electrodes may be advantageously spaced to compensate for nonlinearities that may result because of scan velocity variations along the scanning axis (i.e., variations due to the change from angular to linear velocity).

The invention will be more clearly understood by reference to the following detailed description when read in connection with the accompanying drawings wherein.

Figure 1:
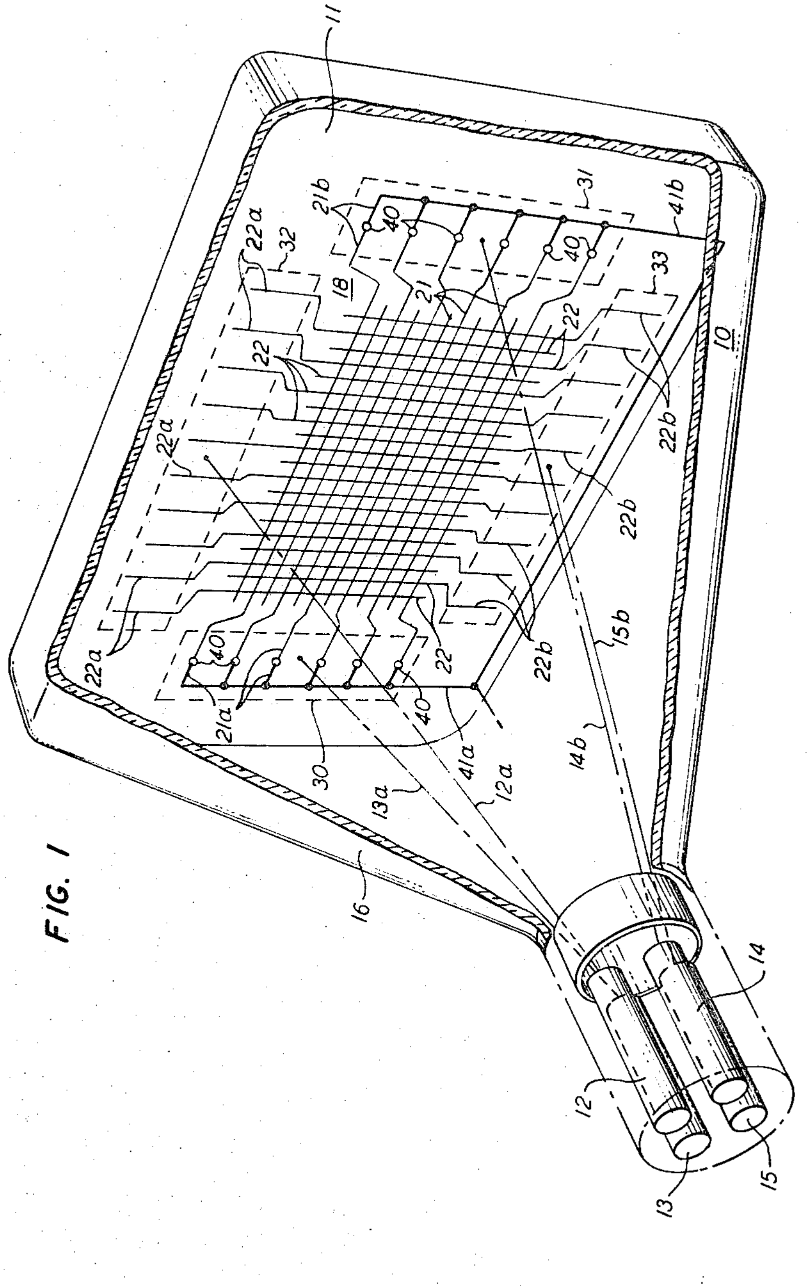
FIG. 1 is a perspective view of a cathode ray tube in accordance with the principles of the present invention.

Referring now to the drawings, FIG. 1 shows a cathode ray tube 10 having a transparent faceplate 11 which may be flat or alternatively have a spherical curvature as desired. Four electron guns 12, 13, 14, and 15 are contained within the tube envelope 16. Also, inside the envelope 16 and on the inner surface of the faceplate 11 is an electroluminescent display matrix 18 which is composed of a layer of electroluminescent material positioned intermediate two arrays of crisscrossing transparent conductive strip electrodes 21 and 22.

Figure 1A:
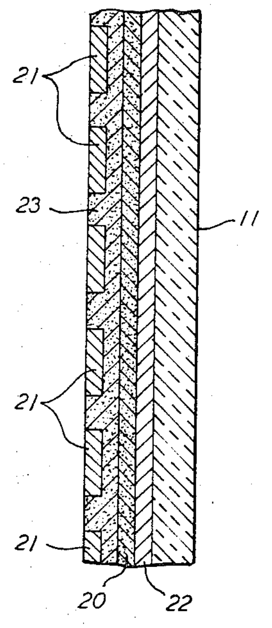
FIG. 1A is a vertical section through the faceplate of the cathode ray tube of FIG. 1.

This sandwich type construction is illustrated in FIG. 1A wherein a layer of electroluminescent material 20 is shown positioned between a series of parallel horizontal conductive strip electrodes 21 and a series of parallel vertical conductive strip electrodes 22. The electroluminescent material 20 may comprise any of the well known electroluminescent phosphors such as zinc sulfide, cadmium sulfide, barium titanate, strontium titanate, et cetera. The transparent conductive strip electrodes 21 and 22 may consist of stannous oxide or any other similar suitable material.

The conductive strip electrodes 22 are deposited directly on the faceplate 11, as shown in FIG. 1A, by evaporation techniques. A layer of electroluminescent material 20 is deposited on top of strip electrodes 22. A layer of nonlinear resistive material 23, such as silicon carbide, is then deposited on the electroluminescent material 20. This nonlinear resistive material 23 should be selected with characteristics to present a high impedance to the generation of a field between intersecting electrodes at voltages other than the voltage established by the selected energized intersecting electrodes. The material 23 will, however, present a low impedance to the higher voltage between the selected energized intersecting electrodes. The proper selection of a nonlinear resistive layer 23 to minimize the effects of crosstalk between adjacent electrodes will be self-evident to those skilled in the art and need not be discussed in detail. An array of parallel conductive strip electrodes 21 is next deposited, by evaporation techniques, onto the nonlinear resistive layer 23. The afore-mentioned depositions of the electroluminescent material, nonlinear resistive material, and conductive strip electrodes are well known in the art and it is not believed necessary to discuss these processes in detail.

The placement and configuration of the crossed arrays are shown in FIG. 1. Preferably the spacing between adjacent parallel electrodes as well as the width of the electrodes themselves is very small, being on the order of thousandths of an inch. The linear density of the strip electrodes may be on the order of three hundred electrodes or more per inch. The conductive electrodes 21*a*, 21*b*, and 22*a* and 22*b* are respectively extended into the commutation areas 30, 31, 32 and 33. These extended electrodes are displaced and flared out along the individual scanning axes of the cathode ray beams to decrease the possibility of the cross section of a scanning cathode ray beam overlapping more than one such extended commutating electrode at a time.

Alternate ones of the vertical strip electrodes 22 (i.e. electrodes 22*a*) are extended into the commutating area 32 where they are spread apart to increase the spacing therebetween. The remaining ones of the vertical strip electrodes 22 are extended into the commutating area 33 and are similarly spread apart. In like fashion, alternate ones of the horizontal strip electrodes 21 are extended into the commutating area 30 and they are spread out as in the case of the vertical electrodes. The remaining ones of the horizontal strip electrodes 21 (i.e. electrodes 21*b*) are similarly extended into the commutating area 31.

The four electron guns 12, 13, 14 and 15 are assembled in the neck of the cathode ray tube 10. The electron guns are paired to scan opposing commutating areas cooperatively with each other, i.e., the electron guns 12 and 15 cooperate to provide the horizontal scan and the electron guns 13 and 14 cooperate to provide the vertical scan. As illustrated in FIG. 1, the extensions 22*a* of the vertical conductive strip electrodes are scanned by the cathode ray beam 12*a*, generated bythe electron gun 12. The balance of the vertical conductive strip electrodes extended into commutating area 33 (i.e. electrodes 22*b*) are scanned by cathode ray beam 15*b* generated by the electron gun 15. The two beams 12*a* and 15*b* are synchronized to excite only one of the vertical conductive strips 22 at a time. The four electron guns 12, 13, 14 and 15 are positioned and their beams controlled such that the cathods ray beam from a given electron gun scans only its assigned scanning area. The circuitry and tube components needed to synchronize, focus, and deflect multiple cathode ray beams simultaneously are well known in the art. These functions are analogous to and hence they can be carried out in accordance with corresponding techniques utilized for example in multigun color television systems. For this reason and to simplify the illustrations, the focusing coils, deflection plates, et cetera have been eliminated from the drawings.

As in the case of the vertical strip electrodes 22 the horizontal conductive strip electrodes 21 are arranged such that alternate ones of the extended horizontal strip electrodes 21*a* are, in effect, scanned by the cathode ray beam 13*a* generated by the electron gun 13. The balance of the horizontal conductive strip electrodes 21*b* are likewise effectively scanned by the cathode ray beam 14*b* generated by the electron gun 14.

The extended horizontal strip electrodes 21*a* and 21*b* are each connected, via photoresistive switches or gates 40, to the bus bar electrodes 41*a* and 41*b*, respectively, each of which is maintained at some preselected common reference potential. The photoresistive switches or gates 40 are located along the respective scanning axes swept by the two cathode ray beams 13*a* and 14*b* so that any gate 40 may be activated in response to excitation by a cathode ray beam. The two cathode ray beams 13*a* and 14*b* are synchronized, as in the case of the scanning beams 12*a* and 15*b*, for the vertical conductive strips.

It should be noted that the extended conductive strip electrodes 21*a*, 21*b*, 22*a* and 22*b* are spread apart so that a rather large deflection of an incident cathode ray beam is equated with a small displacement between successively energized conducting strips at the display matrix area. The distribution of the strip electrode extensions may furthermore be arranged to compensate for nonlinearities in the scanning rate. The details of such an arrangement will be readily apparent to those skilled in the art.

An illuminated spot in the display area is created by a changing electric field applied across the electroluminescent material. The means used to establish this electric field is to energize a vertical and a horizontal electrode via its respective scanning cathode ray beam. The photoresistive gates 40, which are included in the extended strip electrodes 21*a* and 21*b* of the horizontal conductive strip electrodes 21 in the illustrative embodiment, interconnect the horizontal strip electrodes 21 to a common bus electrode 41*a* and 41*b* having a specified reference potential.

The reference potential applied to the common bus electrodes 41*a* and 41*b* may be a fixed direct current potential (e.g. approximately 2000 v.) or as will be apparent to one in the art it may be an alternating potential if a suitably large resistance photoresistor is used. The extended vertical strip electrodes 22*a* and 22*b* are not connected to any bus electrodes; these are energized at the potential of the exciting cathode ray beam.

Figure 2:
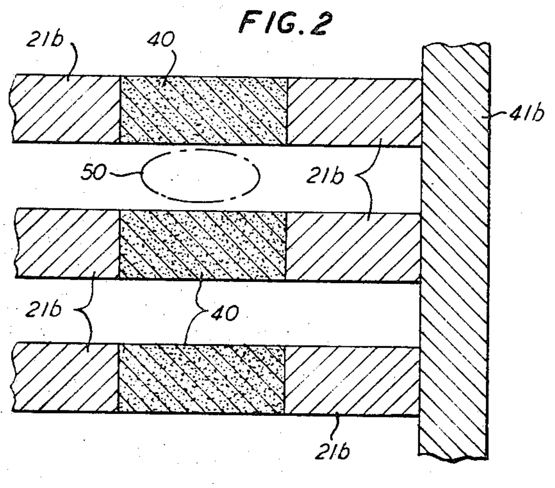
FIG. 2 is a somewhat enlarged plan view of a portion of the commutating section of the faceplate.
Figure 2A:
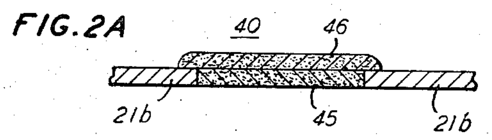
FIG. 2A is a vertical sectional view of one of the photoresistive gate switches used in the commutating section shown in FIG. 2.

The structure of the photoresistive gates or switches 40 may be more clearly seen by reference to FIG. 2 wherein the extended strip electrodes 21*b* are individually connected, via respective photoresistive gates 40, to a bus bar electrode 41*b* which is maintained at a predetermined reference potential. A cross-section view of the detail of the photoresistive gates is shown in the accompanying FIG. 2A. The gate 40 as therein shown comprises a photoresistive material 45, whose degree of conductivity is light sensitive, forming a conducting connecting link between the extended strip electrode 21*b* and the common bus 41*b*. The photoresistive material may comprise cadmium selenide, antimony trisulphide or similar material. As illustrated in FIG. 2A, the photoresistive material 45 is overlaid with a phosphor material 46. The phosphor material 46 may comprise any of the well known cathodoluminescent materials that emit visible light when excited by a cathode ray beam. As the cathode ray beam scans the appropriate commutative area, the beam impinging on the phosphor material 46 causes it to emit light. The emission of this light lowers the resistance of the photoresistive material 45 and thus effectively connects the conductive strip 21*b* to the common bus potential on bus 41*b*.

The cross section of the commutating cathode ray beam 50 is shown in FIG. 2 in the form of an ellipse. This distortion from the ideal circular cross section is due to a typical aberration of an electronic lens known as astigmatism. In the ordinary cathode ray display this distortion of the shape of the illuminating spot is a limitation of the attainable resolution of the display. It is easily seen, however, that in the present invention a deliberate distortion of the cathode ray beam in this manner may be used to advantage by permitting closer spacing of the extended strip electrodes 21*a* and 21*b* without the danger of the beam cross section overlapping two such strip electrodes. Hence, because of this closer spacing the information will be displayed with more inherent resolution per unit angular deflection of the commutating beam than can normally be attained.

While a particular embodiment of the present invention has been shown and described, it is apparent that various changes and modifications may be made without departing from the spirit and scope of the invention. For instance, the distances between the commutating electrodes may be advantageously arranged according to some function to compensate for nonlinearities in the scanning rate or to achieve some special effect in the display. Such modifications will be readily apparent to those skilled in the art as falling within the true spirit and scope of the invention.

What is claimed is:

1. A cathode ray tube comprising an evacuated chamber and a signal display surface, said signal display surface comprising a glass faceplate, a first parallel array of transparent conducting strip electrodes deposited on the inner surface of said glass faceplate, a layer of electroluminescent material deposited on said first parallel array, a second parallel array of transparent conducting strip electrodes proximate to the side of said layer of electroluminescent material opposite to said first parallel array, the direction of the conducting strip electrodes of said first parallel array being perpendicular to the direction of the conducting strip electrodes of said second parallel array, alternate ones of said conducting strip electrodes of said first parallel array being extended and flared out to one side of the array, the remaining ones of said conducting strip electrodes of said first parallel array being extended and flared out to the side opposite to said one side of said array, means for generating a first and second cathode ray beam to respectively scan said extensions of said first parallel array, alternate ones of said conducting strip electrodes of said second parallel array being extended and flared out to one side of said second array and connected through respective cathode ray beam responsive gates to a first common bus, the remaining ones of said conducting electrodes of said second parallel array being extended and flared out to the side opposite to said one side of said second array and connected through respective cathode ray beam responsive gates to a second common bus, said first and second busses being maintained at a given potential and a third and fourth cathode ray beam to respectively scan said gates interconnecting said second array to said first and second common bus, respectively.

2. The combination described in claim 1 wherein said cathode ray beam responsive gates each comprise a photoresistive material connecting a conducting electrode to a common bus, and a phosphor material of the type that emits light when excited by a cathode ray beam deposited on said photoresistive material.

3. A cathode ray tube comprising a faceplate, a display panel including a first plurality of horizontal transparent conducting electrodes deposited on said faceplate, an electroluminescent material deposited on said first plurality of electrodes, a second plurality of vertical transparent conducting electrodes proximate to said electroluminescent material and on the side thereof opposite the first plurality of electrodes, alternate electrodes of said first plurality being respectively extended beyond the opposite vertical sides of said display panel, alternate electrodes of said second plurality being respectively extended above and below the horizontal sides of said display panel, means to generate a first pair of cathode ray beams to scan the extended alternate electrodes of said first plurality in a vertical direction, said first pair of cathode ray beams being coordinated in their scanning action to energize only one conducting electrode of said first plurality at a time, and means to generate a second pair of cathode ray beams to scan the extended alternate electrodes of said second plurality in a horizontal direction, said second pair of cathode ray beams being coordinated in their scanning action to energize only one conducting electrode of said second plurality at a time.

4. The combination as defined in claim 3 including a source of reference potential, gating means to individually interconnect said reference potential to each conducting electrode of one of said pluralities of conducting electrodes, each of said gating means comprising a photoresistive switch having a phosphorescent coating deposited thereon and responsive to excitation by said cathode ray beams.

References Cited

UNITED STATES PATENTS 2,967,972 1/1961 De Haan ------------ 315—13

RODNEY D. BENNETT, *Primary Examiner.*

M. F. HUBLER, *Assistant Examiner.*